(12) United States Patent
Fuchs et al.

(10) Patent No.: US 9,071,119 B2
(45) Date of Patent: Jun. 30, 2015

(54) ADJUSTING DEVICE FOR AN ELECTRIC MOTOR

(75) Inventors: Andreas Fuchs, Bern (CH); Klaus Fiederer, Dürbheim (DE); Lars Girsberger, Schaffhausen (CH); Emiliano Villanova, Neunkirch (CH)

(73) Assignee: Marquardt GmbH, Rietheim-Weiheim (DE)

( * ) Notice: Subject to any disclaimer, the term of this patent is extended or adjusted under 35 U.S.C. 154(b) by 497 days.

(21) Appl. No.: 13/189,020

(22) Filed: Jul. 22, 2011

(65) Prior Publication Data

US 2012/0013205 A1 Jan. 19, 2012

Related U.S. Application Data

(63) Continuation of application No. PCT/DE2010/000060, filed on Jan. 22, 2010.

(30) Foreign Application Priority Data

Jan. 24, 2009 (DE) .......................... 10 2009 006 067
Jan. 24, 2009 (DE) .......................... 10 2009 006 068

(51) Int. Cl.
  *H02K 7/14* (2006.01)
  *H02K 23/66* (2006.01)
  *H02K 5/14* (2006.01)
  (Continued)

(52) U.S. Cl.
  CPC .................. *H02K 23/66* (2013.01); *H02K 5/14* (2013.01); *H02K 11/0073* (2013.01); *H02K 23/18* (2013.01)

(58) Field of Classification Search
  USPC .............. 310/239, 241, 242, 244, 245, 50, 71
  See application file for complete search history.

(56) References Cited

U.S. PATENT DOCUMENTS 3,440,465 A * 4/1969 Provost, Jr. et al. .......... 310/230
5,753,993 A * 5/1998 Steidle et al. ................. 310/239
6,031,306 A * 2/2000 Permuy ........................ 310/67 R
(Continued)

FOREIGN PATENT DOCUMENTS

DE 197 36 300 A1 4/1998
DE 199 38 342 A1 2/2000
(Continued)

OTHER PUBLICATIONS

English translation of EP 235735 from EPO website, Kress-Elektrik, GmbH Co E, Sep. 1987, description.*
(Continued)

*Primary Examiner* — Naishadh Desai
(74) *Attorney, Agent, or Firm* — Burr & Brown, PLLC

(57) ABSTRACT

A device for reversing the direction of rotation and/or for adjusting the carbon brushes for a reversible electric motor, in particular for an electric hand tool, with a base and with a mount, which is mounted pivotably on the base and on which brushholders for the carbon brushes wiping over the collector of the electric motor are arranged. The electric motor can be driven by means of power electronics, such as a pulse width controller, a phase gating controller, a phase chopping controller or the like. The power electronics are arranged on the base and/or on the mount. The device furthermore has fixed contacts and switching contacts, which interact with alternate contact-making for reversing the direction of rotation of the electric motor as the mount is pivoted.

14 Claims, 7 Drawing Sheets

(51) Int. Cl.
*H02K 11/00* (2006.01)
*H02K 23/18* (2006.01)

(56) References Cited

U.S. PATENT DOCUMENTS

| | | | |
|---|---|---|---|
| 6,124,652 A * | 9/2000 | Karasa et al. | 310/50 |
| 6,133,665 A * | 10/2000 | Prell et al. | 310/239 |
| 6,927,522 B2 * | 8/2005 | Skofljanec | 310/239 |
| 6,933,632 B2 * | 8/2005 | Braml et al. | 310/50 |
| 7,355,314 B2 * | 4/2008 | Riedl et al. | 310/239 |
| 7,511,397 B2 * | 3/2009 | Eisert et al. | 310/239 |
| 7,600,577 B2 * | 10/2009 | Simm et al. | 173/2 |
| 7,876,004 B2 * | 1/2011 | Kuhnle et al. | 310/50 |
| 2004/0195928 A1 * | 10/2004 | Skofljanec | 310/239 |
| 2007/0001536 A1 * | 1/2007 | Riedl et al. | 310/241 |

FOREIGN PATENT DOCUMENTS

| | | | | |
|---|---|---|---|---|
| DE | 10 2005 000 084 A1 | 1/2007 | | |
| EP | 0 235 735 A1 | 9/1987 | | |
| EP | 235735 A1 * | 9/1987 | | H02K 23/66 |
| EP | 0 271 714 A2 | 6/1988 | | |
| EP | 271714 A2 * | 6/1988 | | H02K 5/14 |
| EP | 0 778 655 A2 | 6/1997 | | |
| EP | 1 447 900 A2 | 8/2004 | | |
| EP | 1 742 332 A2 | 1/2007 | | |
| WO | 2005/078907 A1 | 8/2005 | | |

OTHER PUBLICATIONS

Machine translation of EP 0271714.*
Machine translation of EP 0235735.*

* cited by examiner

Illustration without upper part

ADJUSTING DEVICE FOR AN ELECTRIC MOTOR

CROSS REFERENCE TO RELATED APPLICATIONS

This application is a continuation of International Application No. PCT/DE2010/000060 filed Jan. 22, 2010, which designated the United States, and claims the benefit under 35 USC §119(a)-(d) of German Application Nos. 10 2009 006 067.7 and 10 2009 006 068.5 filed Jan. 24, 2009, the entireties of which are incorporated herein by reference.

FIELD OF THE INVENTION

The invention relates to a device for reversing the direction of rotation and/or for adjusting the carbon brushes for a reversible electric motor.

BACKGROUND OF THE INVENTION

Such devices, in particular in the form of an adjusting ring, are used in electric tools which are operated on alternating current (AC) or direct current (DC). These electric tools can be provided with an electronics controller. The electric motor for the electric hand tool can be a brushless (EC) motor.

EP 0 778 655 A2 has disclosed a device for adjusting the carbon brushes in the form of an adjusting ring for a reversible electric motor with a base and with a mount mounted pivotably on the base. Brush holders for the carbon brushes wiping over the collector of the electric motor are arranged on the mount. The adjusting ring therefore acts as a holder for the carbon brushes of the mechanical commutator of the electric motor. Rotation of the adjusting ring brings about a change in the direction of rotation of the electrical machine. Furthermore, the adjusting ring enables optimum commutation in the case of counterclockwise and/or clockwise rotation of the electric motor, as a result of which a reduction in the brush sparking and radio interference and a longer life of the carbon brushes are achieved.

In electric tools, the electric motor can often be driven by means of power electronics, such as a pulse width controller, a phase gating controller, a phase chopping controller or the like. The power electronics can be arranged on a printed circuit board as a separate component part at an expedient point in the housing of the electric tool, for example in the handle of the electric tool. Electrical switches located in the handle for electric tools are also known, for example, in which the power electronics are arranged in the switch housing. Since the commutation advantageously takes place directly on the electric motor, the brushes and the collector are cooled effectively thanks to the flow from the motor fan. On the other hand, the power adjustment generally takes place in the handle or in the switch housing. It is difficult for the heat to be dissipated here owing to the low level of or lack of air flow.

SUMMARY OF THE INVENTION

The invention is based on the object of developing the device for reversing the direction of rotation and/or for adjusting the carbon brushes in such a way that the dissipation of heat for the power electronics is improved. A particular object is to structure the drive system of electric tools in optimum fashion in order to achieve minimum costs, to be precise component costs, procurement costs and/or logistics costs, installation costs or the like, optimum heat dissipation and maximum power.

In the device according to the invention for reversing the direction of rotation and/or for adjusting the carbon brushes, at least parts of the power electronics are arranged on the base and/or on the mount. Preferably, not only part of the power electronics but the entire power electronics are located on the base and/or on the mount of the adjusting ring. In contrast to the prior art, in which the power electronics are not part of the adjusting ring, the invention therefore provides a unit for the commutation and/or power adjustment of electrical machines, in particular in the electric tool, i.e. a power adjusting ring. This also solves the problem of physically combining commutation and/or power adjustment and possibly further functions. The reason why commutation and/or power adjustment should be combined physically is the improved heat dissipation for the power part, as has already been mentioned. In addition, splitting the electrical system into modules which conduct either power and/or signal currents enables a considerable simplification of the wiring and the physically optimum positioning of the functions. A clear separation between lines which conduct the signal currents and those which conduct the power currents is thus possible.

In a simple configuration, the switching contacts which can be configured in the form of contact blades are located on the brushholders, which are electrically connected to the carbon brushes. The fixed contacts, which are electrically connected to the field windings of the electric motor, are arranged on the base. The fixed contacts interact with the switching contacts as mating contacts with alternate contact-making of the carbon brushes for reversing the direction of rotation of the electric motor as the mount is pivoted.

In a manner which is conventional per se, the power electronics can have at least one power semiconductor, which switches the currents in the motor turns of the electric motor, for example a triac, a thyristor, a MOSFET, a power diode, an H bridge or the like. Expediently, signal processing electronics having sensors, such as current sensors and/or sensors for the rotor position of the electric motor, are arranged on the base and/or on the mount. In order to achieve particular protection against the effect of harmful substances, the signal processing electronics and/or the power electronics can be encapsulated, cast or the like.

In a further configuration, the base and/or the mount can comprise elements of the electric motor. In particular, a bearing shell for a ball bearing of the rotor shaft of the electric motor can be arranged on the base and/or on the mount. The base and/or the mount can form part of the housing or the supporting structure of the electric hand tool. This provides integration of component parts, as a result of which a more compact design and a reduction in costs are achieved.

In order to further improve the heat dissipation, conducting fins for guiding a cooling air flow, which serves in particular to cool the electric motor, can be arranged on the base and/or on the mount. As a result, the cooling air flow for the electric motor cools the power electronics at the same time. Likewise, a heat sink can be arranged on the base and/or on the mount for cooling the power electronics. In particular, the heat sink is located on a power semiconductor or is at least thermally connected to the power semiconductor. Expediently, the metallic parts of the brushholders for the carbon brushes are in the form of parts which conduct heat and/or emit heat to the air. Finally, the terminals of the power semiconductors in the power electronics can also make electrical and/or thermal contact directly with the brushholders for the carbon brushes in order to achieve a further improvement in the dissipation of heat.

Generally, the base and/or the mount is/are produced from plastic by means of injection molding. The supporting structure of the base and/or the mount can also consist of metal, instead of plastic, however. As a result, the supporting structure at the same time serves to spread heat, to conduct heat, to emit heat or the like to the air. Instead of air, it is also possible for another fluid to serve to transport the heat away in the form of a cooling circuit, in which case this fluid is expediently a fluid with a relatively high thermal capacity. It is furthermore possible for the base and/or the mount to be structured physically in such a way as to enable shielding for improving the electromagnetic compatibility (EMC) and/or for preventing a flow of heat from the carbon brushes to the heat-sensitive parts, for example the power electronics.

In order to achieve a further increase in the dissipation of heat, a fan for generating a cooling air flow can be arranged on the base and/or on the mount for cooling the power electronics. If desired, such a fan can only cool the power adjusting ring or then also, in addition, the electric motor in the event of a blockage. In order to be able to adapt well to the heat which needs to be dissipated in each case, the fan power can be subjected to open-loop and/or closed-loop control.

In a compact configuration, a plug or another connection for the connection to the power supply system, for the connection to the power electronics, for the connection, with mechanical and/or electrical contact, to an adjusting element with a potentiometer or the like can be arranged on the base and/or the mount. The power adjusting ring can have a connection possibility, to be precise on the side associated with the handle, for example, by means of which mechanical and electrical contact can be made with an operating element. This operating element may be a so-called potentiometer switch for enabling control of the speed for the electric motor of the electric tool by the user. Furthermore, it is also possible to arrange a rotary potentiometer as adjusting element for the power electronics on the base and/or on the mount.

If the electric motor does not have any carbon brushes, the device for reversing the direction of rotation for the reversible electric motor, which is intended in particular for an electric hand tool, can have a base and a mount mounted pivotably on the base, switching contacts, in particular in the form of contact blades, being arranged on the mount and fixed contacts being arranged on the base. Conversely, it is of course also possible for the switching contacts to be arranged on the base and for the fixed contacts to be arranged on the mount. The electric motor can be driven by means of power electronics, such as a pulse width controller, a phase gating controller, a phase chopping controller or the like. In contrast to the prior art, in which the power electronics are not part of the adjusting ring, according to the invention at least part of the power electronics is arranged on the base and/or on the mount, with the result that a power adjusting ring is provided. Such an adjusting ring is particularly suitable for brushless (EC) machines which operate in the system or battery voltage range and contains the unit comprising microcontrollers or logic circuits and power semiconductors. If sensorless operation is not intended, the unit also contains sensors for detecting the rotor position. There is thus no need for carbon brushes and the mechanical reversal of direction of rotation, with the latter being replaced by a changeover switch of any type, which only conducts signal current and can also be configured in the form of an adjusting ring.

For a particularly preferred configuration, the following should also be noted. The invention provides a unit which firstly has the functionality of an adjusting ring, i.e. a rotatable brushholder, and secondly has the functionality of a power adjuster. In the text which follows, this unit will also be referred to as a power adjusting ring. A power adjuster is understood to mean a module which switches or controls the currents in the motor turns. Examples of these are triacs, thyristors, MOSFETs, power diodes and combinations thereof or power output stages for a three-phase system, such as three H bridges, for example. Power adjusters can have sensors, such as current sensors or sensors for the rotor position, for example.

The following can also be mentioned with respect to preferred embodiments. The basic functions in the electrical system of the machines in the context of the entire system "electric tool" are:

the human/machine interface, generally a sprung pushbutton which acts on the wiper of a linear potentiometer,
switch-on and/or switch-off,
the reversal of direction of rotation,
the monitoring part for measurement, open-loop control, closed-loop control or else parts and/or combinations thereof,
adjusting the power, i.e. the power adjuster or the output stage,
commutation of the electrical machine.

In the case of AC machines or brushed DC machines, the commutation is performed either by fixed brush plates or by adjusting rings, which press the brushes onto the collector of the machine rotor. In the case of battery-operated brushless EC machines, the commutation takes place by means of the switching logic of the semiconductors of the power output stage.

The human/machine interface is reduced to its minimal function, i.e. to reading the wishes of the appliance user. It is in the form of a potentiometer switch, which only switches or modulates signal currents. The monitoring part and the power stage and the adjusting ring form one unit, to be precise the power adjusting ring. The cables transmitting power lead from the energy source, the power supply system or a rechargeable battery pack, directly to the power adjusting ring. The monitoring part comprises electronics which are in the form of a ring or flexible print. This enables integration in the power adjusting ring.

The power adjusting ring has two switching positions, to be precise in each case one switching position for the clockwise rotation and for the counterclockwise rotation of the electric motor. However, the power adjusting ring can also have more than two switching positions, for example a third switching position, in which the electric tool is in the "off" state. A preferred embodiment for this provides the following. If the pushbutton or trigger is pressed as a manual handle by the user, the power adjusting ring snaps out of a forced midposition into the clockwise rotation position (CW) or counterclockwise rotation position (CCW) for the electric motor, to be precise depending on the preselection by the handle on the power adjusting ring which can be gripped by the fingers of the user.

In developments, the power adjusting ring can also include the monitoring part of a switch, to be precise that which is responsible for the measurement and open-loop and closed-loop control. The signal-processing electronics and the power electronics can be encapsulated or cast. The unit can additionally comprise elements of the electrical machine, for example it can contain a bearing shell or a ball bearing of the rotor shaft. The unit can represent part of the housing or the supporting structure of the electrical machine. In the case of EC machines for system or battery voltage, the unit contains microcontrollers or logic circuits and power semiconductors. If sensorless operation is not envisaged, the unit also contains sensors for the detection of the rotor position. The carbon brushes and the mechanical reversal of the direction of rotation can then be dispensed with. The latter is replaced by a changeover switch of any type which only conducts signal current and which can also be in the form of an adjusting ring. The power adjusting ring can comprise conducting fins for guiding the cooling air flow. The power adjusting ring can have a fan. This only cools the power adjusting ring or then also the motor in the event of a blockage. The fan power can be subjected to open-loop or closed-loop control. The unit can contain a plug. The power adjusting ring can have a heat sink. The metallic parts of the carbon brushholder can be in the form of parts which conduct heat or emit heat to the air. The supporting structure of the power adjusting ring can be metallic and at the same time serves to spread heat or conduct heat or emit heat to the air or another fluid. Terminals of the power semiconductors can make direct electrical or else thermal contact with the holders for the carbon brushes. The power adjusting ring can be structured physically intrinsically so as to enable shielding for the purpose of improving the EMC, for example, or such that it is not possible, for example, for the heat to flow from the brushes to the parts which are more sensitive to heat, for example the monitoring stage. The power adjusting ring can have, for example on the side of the handle, a connection possibility by means of which mechanical and electrical contact can be made with an operating element, such as a potentiometer switch. The adjusting ring can have the function of a rotary potentiometer.

The advantages achieved by the invention consist in particular in that the electrical conductors transmitting the power no longer pass through the switch housing, as they used to, but directly to the power adjusting ring in the motor housing or on the motor. The wiring complexity is minimized, which results in cost savings and simpler fitting. The electrical efficiency increases and the waste heat can be emitted directly into the cooling air flow of the electrical machine. The improved heat dissipation achieved with the aid of the invention also makes it possible to use less expensive power semiconductors. There is also the potential for using the same basic structure for AC, DC and/or EC drives since the power-conducting subassemblies are located in a line with the motor and the operating element in the handle only conducts signal currents. Finally, new design freedom is provided in the handle by virtue of the fact that there is now no need for space for the power adjuster.

The following will also be mentioned as further advantages achieved by the invention:
  The power electronics are located in the cooling air flow. As a result, savings can be made on the heat sink or on the power semiconductor. Alternatively, an increase in power is also possible.
  The reversal of the direction of rotation via a mechanical adjusting ring is more effective and less expensive than fully electronic reversal of the direction of rotation.
  The "accelerator" signal for the speed of the electric motor is made possible via a very simple potentiometer adjuster, merely by means of control currents. The ON/OFF function can be realized electronically without any mechanical contact. As a result, slimmer handles are possible.
  It is possible for there to be very simple wiring by means of signal lines and lines for the power current in the machine. The power is only conducted where it is necessary.
  A "fully electronic switch" can be realized in a simple manner.

As has already been mentioned, switching contacts in the form of contact blades which are electrically connected to the carbon brushes can be located on the brushholders. Fixed contacts which are electrically connected to the field windings of the electric motor are arranged on the base. The fixed contacts interact with the switching contacts as mating contacts with alternate contact-making of the carbon brushes for reversing the direction of rotation of the electric motor as the mount is pivoted. The fixed contact consists of a resilient contact arm, which exerts a force on the non-resilient mating contact of the switching contact in the case of single-point contact. It has been shown that such a contact arrangement in some extreme use cases of the electric tool is not always operationally safe and is subjected to certain, possibly premature wear.

Therefore, the invention is furthermore based on the object of developing the device for reversing the direction of rotation and/or for adjusting the carbon brushes in such a way that the contact stability is improved. In particular, optimized tolerance-insensitive contact-making is intended to be provided which withstands extreme vibrations as occur during percussion drilling operation, for example.

This object is achieved in the case of a device of the generic type for reversing the direction of rotation and/or for adjusting the carbon brushes.

In this device according to the invention for reversing the direction of rotation and/or for adjusting the carbon brushes, the fixed contact is configured as a contact arm bent in the form a U and two mating contacts are arranged as switching contacts in such a way that the fixed contact exerts a force on both sides against the mating contacts of the switching contact. The invention therefore provides double-point contact for adjusting rings and switches, with a resilient contact arm which is bent in the form of a U exerting a force on both sides against two non-resilient mating contacts. Therefore, even under extreme loads, high contact stability and operational reliability are achieved and the life of the device is further extended.

The brushholder can have a two-part configuration. Expediently, the brushholder comprises a base plate consisting of copper and a holder consisting of brass. In a preferred embodiment, the contact arms of the fixed contact are configured so as to be resilient and the mating contacts on the switching contact are configured so as to be fixed, i.e. non-resilient. In another development, the contact arms of the fixed contact are configured so as to be fixed, i.e. non-resilient, and the mating contacts on a switching contact are configured so as to be resilient. In this case, the base plate of the brushholder can act as resilient element for the mating contact. In a further configuration, the fixed contact in the form of a contact track is bent in such a way that two resilient contact arms exert a force from the outside against the two mating contacts.

In order to be able to switch even higher currents, elongate contact rivets can be applied to the contact arms of the fixed contact, said contact arms being configured as wedge faces. It is therefore then possible for switching to take place safely under load current. Expediently, the mating contacts are provided with contact rivets. Furthermore, the contacts can be coated, for example with a precious metal, in order to extend the life.

The following is mentioned in relation to specific embodiments. Such brushholder systems with switchover between clockwise and counterclockwise rotation have:
  Brushholders comprising two parts, namely a base plate consisting of copper and a holder consisting of brass.

Contact track bent in such a way that the resilient contact arms exert a force against two mating contacts from the outside instead of from the inside.

Contact track formed as non-resilient part. The base plate then acts as the resilient element.

Elongate contact rivets are applied to the wedge faces in order that switching can also take place under current. The mating contact can or cannot be provided with contact rivets.

The contacts can be coated.

The advantages achieved by the invention consist in particular in that the contact-making in the adjusting ring is optimized, in particular with respect to sensitivity to tolerances, installation safety, resistance to vibrations, contact stability, temperature increase and current loading capacity. If contact-making is interrupted as a result of vibrations, it is still possible for the second contact point to conduct current, which ensures permanent transmission of current.

The following advantages also result:

The temperature increase under load is less than with previous contact-making with a resilient arm. This is because of the two parallel and therefore redundant contact junctions.

Increased contact stability as a result of mutual support under vibrations and less transfer resistance than previously.

A lower contact force than was previously the case is possible. This also results in decreased erosion at the contacts.

The geometrical dimensions which influence the contact force can be maintained and monitored more easily during manufacture.

The dependence and influencing of the contact force in the previous solution results from:

A plurality of bends in the contact track.
The contact track being accommodated in the base.
Deformation in the base.
Base—upper part guidance.
Base—upper part abutment.
Upper part deformation.
Accommodation of brushholder on base.
Dimensional accuracy of brushholder (material constants) and insertion depth.

In the solution according to the invention, on the other hand, the contact force is influenced merely by the opening dimension of the fixed contacts, the opening dimension of the U-shaped bow of the contact track and by the insertion depth, and thus the insensitivity to tolerances is improved.

BRIEF DESCRIPTION OF THE DRAWINGS

An embodiment in accordance with the prior art, i.e. with a conventional right/left changeover switch and without an adjusting ring, is illustrated in FIG. 1. An exemplary embodiment of the invention with various developments and configurations is illustrated in the drawings from FIG. 2 onwards and will be described in more detail below.

DETAILED DESCRIPTION OF THE INVENTION

Figure 1:
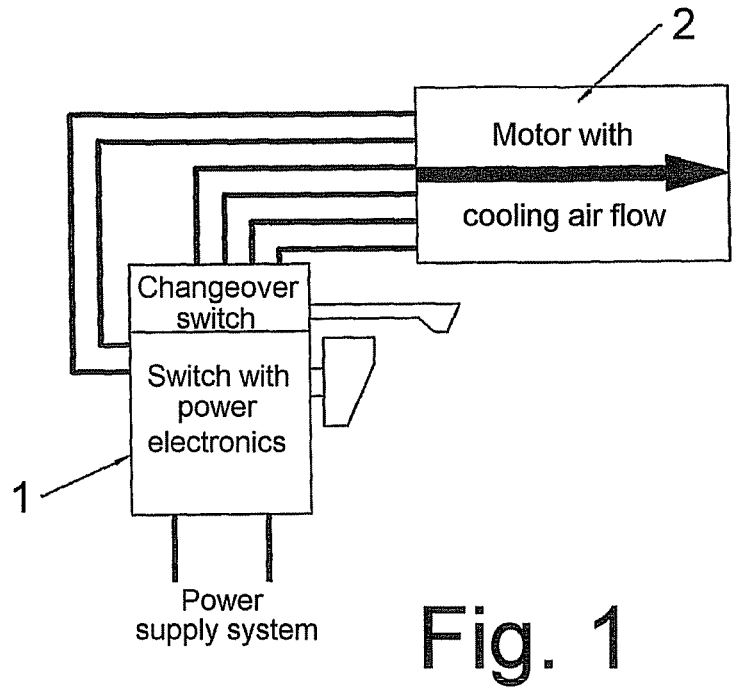
FIG. 1 shows the arrangement of the power electronics in an electric tool in accordance with the prior art in a schematic.
Figure 2:
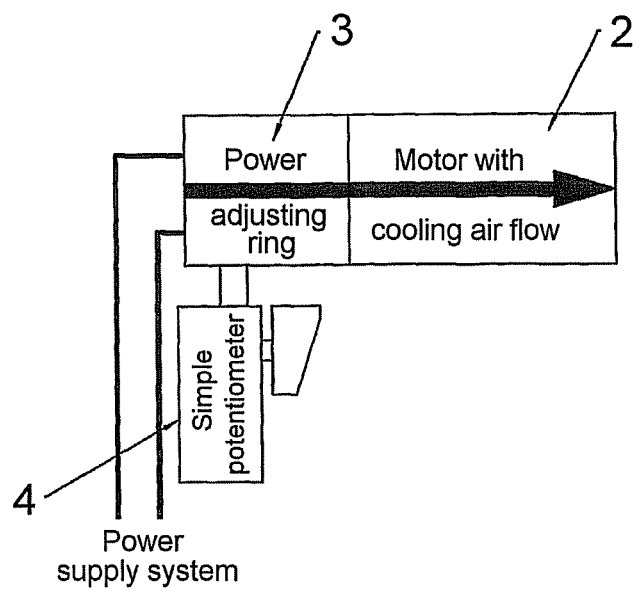
FIG. 2 shows the arrangement according to the invention of the power electronics in an electric tool as a schematic block circuit diagram.

As can be seen from FIG. 1, until now the switch 1 with power electronics is not located in the air flow for the electric motor 2. A conventional right/left (RL) changeover switch is used. This requires large heat sinks, expensive component parts, many lines and the like and sets narrow power limits. In accordance with FIG. 2, in the invention the power electronics for the electric tool, such as for a drill or a screwdriver, are moved by the switch 4 into the mechanically adjustable carbon brushholder and thus into the adjusting ring 3 for reversing the direction of rotation. As a result, the power electronics are located in the cooling air flow for the electric motor 2. Thus, higher powers and/or less expensive component parts are possible and fewer electrical lines are required. For example, now only two power-conducting lines plus two signal lines are required instead of eight power-conducting lines.

Figure 3:
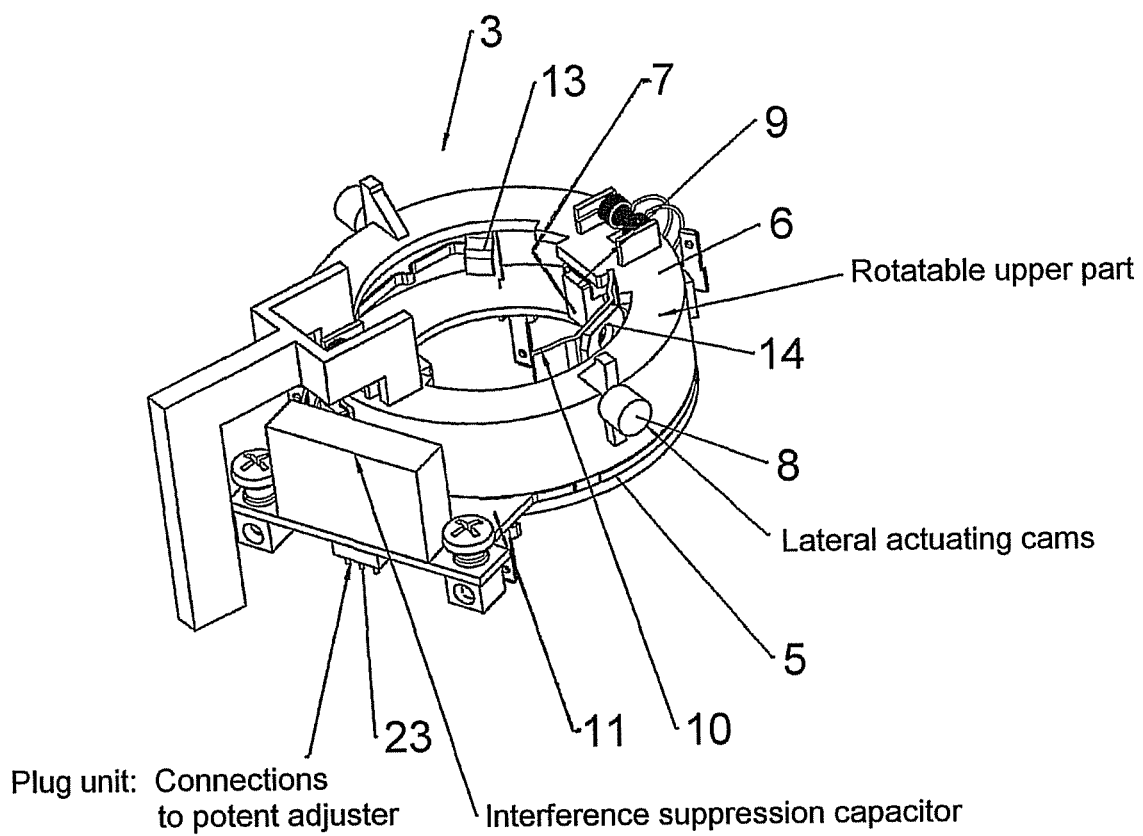
FIG. 3 shows a device according to the invention for adjusting the carbon brushes in a perspective view.

As can furthermore be seen from FIG. 3, the adjusting ring 3 has a base 5 and a mount 6 which is mounted pivotably on the base 5 as device for adjusting the carbon brushes 7 for the reversible electric motor of an electric hand tool. Brushholders 9 for the carbon brushes 7 wiping over the collector of the electric motor are arranged on the mount 6, which is capable of being pivoted by means of lateral actuating cams 8. The electric motor can be driven by means of power electronics 10 (shown in FIG. 6), which is a pulse width controller, a phase gating controller, a phase chopping controller or the like. The power electronics 10 located on a printed circuit board 11 are arranged on the base 5. If desired, it is possible for the power electronics 10 to also be located on the mount 6, but this is not shown in any more detail here.

Figure 5:
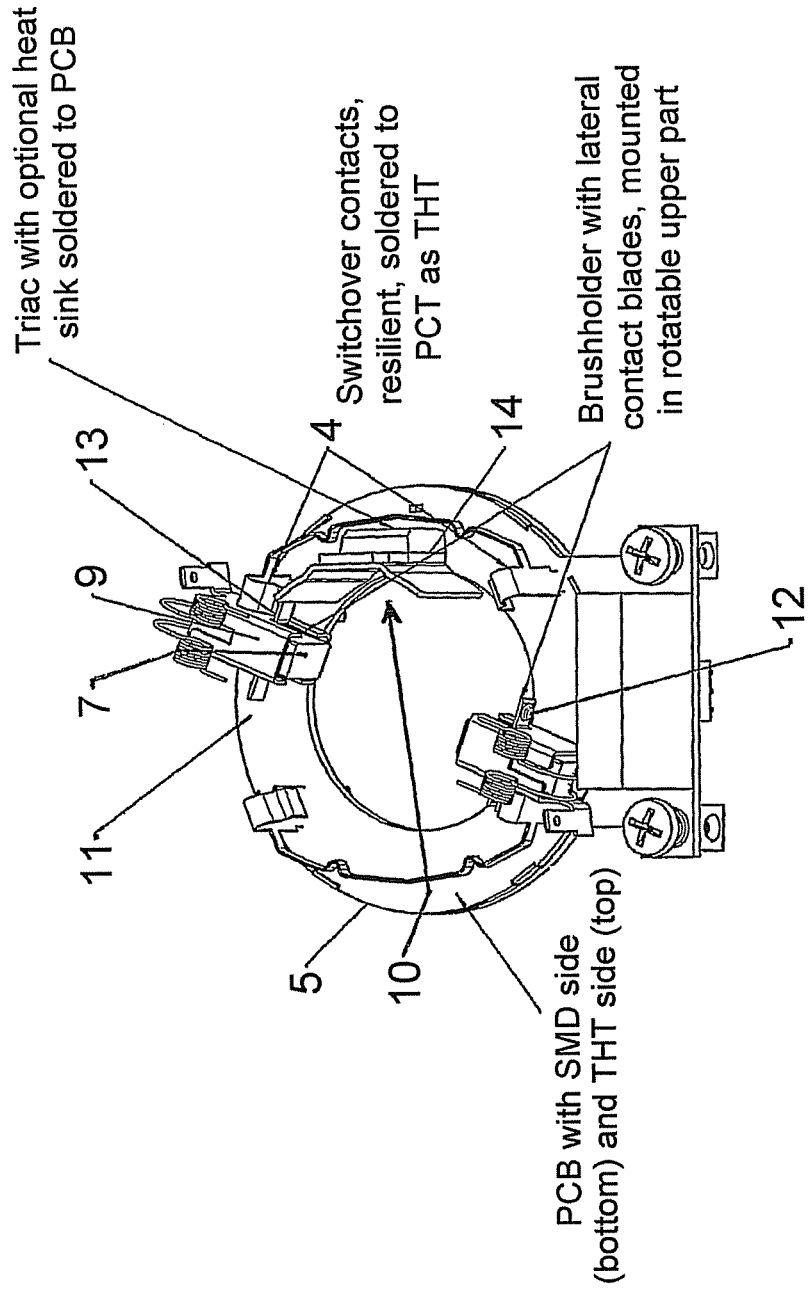
FIG. 5 shows the device corresponding to FIG. 3, with individual parts omitted.

As can be seen in FIG. 5, the switching contacts 12 in the form of contact blades are located on the brushholders 9, which are electrically connected to the carbon brushes 7. Furthermore, fixed contacts 13, which are electrically connected to the field windings of the electric motor, are arranged on the base 5, to be precise are soldered to the printed circuit board 11. The fixed contacts 13 interact with the switching contacts 12 as mating contacts with alternate contact-making of the carbon brushes 7 for reversing the direction of rotation of the electric motor as the mount 6 is pivoted. Moreover, the described device can act as a changeover switch for the direction of rotation for a brushless electric motor without any carbon brushes 7, with in turn the power electronics 10 being arranged on the base 5 and/or on the mount 6.

The power electronics 10 have at least one power semiconductor 14, which switches or controls the currents in the motor windings of the electric motor. For example, the power semiconductor 14 may be a triac, a thyristor, a MOSFET, a power diode, an H bridge with power semiconductors, relays and/or electrical switches or the like. Signal processing electronics (not shown in any further detail), which have sensors, such as current sensors and/or sensors for the rotor position of the electric motor, can likewise be arranged on the base 5 and/or on the mount 6. Expediently, the signal processing electronics and/or the power electronics 10 can be encapsulated or cast for protection purposes.

In developments of the device 3 for adjusting the carbon brushes 7 which are not illustrated in detail in the figures, however, the base 5 and/or the mount 6 can comprise elements of the electric motor, in particular a bearing shell for a ball bearing of the rotor shaft of the electric motor. The base 5 and/or the mount 6 can form part of the housing or the supporting structure of the electric hand tool. Expediently, the supporting structure of the base 5 and/or the mount 6 can consist of metal such that the supporting structure at the same time serves to spread heat, conduct heat, emit heat or the like to the air and/or another fluid. Furthermore, the base 5 and/or the mount 6 can be structured physically in such a way as to enable shielding for improving the EMC or the prevention of a flow of heat from the carbon brushes 7 onto the heat-sensitive parts, for example the power electronics 10.

It is possible for conducting fins for guiding a cooling air flow serving in particular to cool the electric motor to be arranged on the base 5 and/or on the mount 6 in such a way that the cooling air flow cools the power electronics 10. In addition, it is also possible for a heat sink to be arranged on the base 5 and/or on the mount 6 for cooling the power electronics 10. The metallic parts of the brushholders 9 for the carbon brushes 7 can be in the form of parts which conduct heat and/or emit heat to the air. Finally, a fan for generating a cooling air flow can be arranged on the base 5 and/or on the mount 6 for cooling the power electronics 10, with the fan cooling the power adjusting ring 3 or then also the electric motor in the event of a blockage. The fan power of the fan can be subjected to open-loop and/or closed-loop control for this purpose. Furthermore, the terminals of the power semiconductors 14 in the power electronics 10 can make direct electrical and/or thermal contact with the brushholders 9 for the carbon brushes 7.

Figure 4:
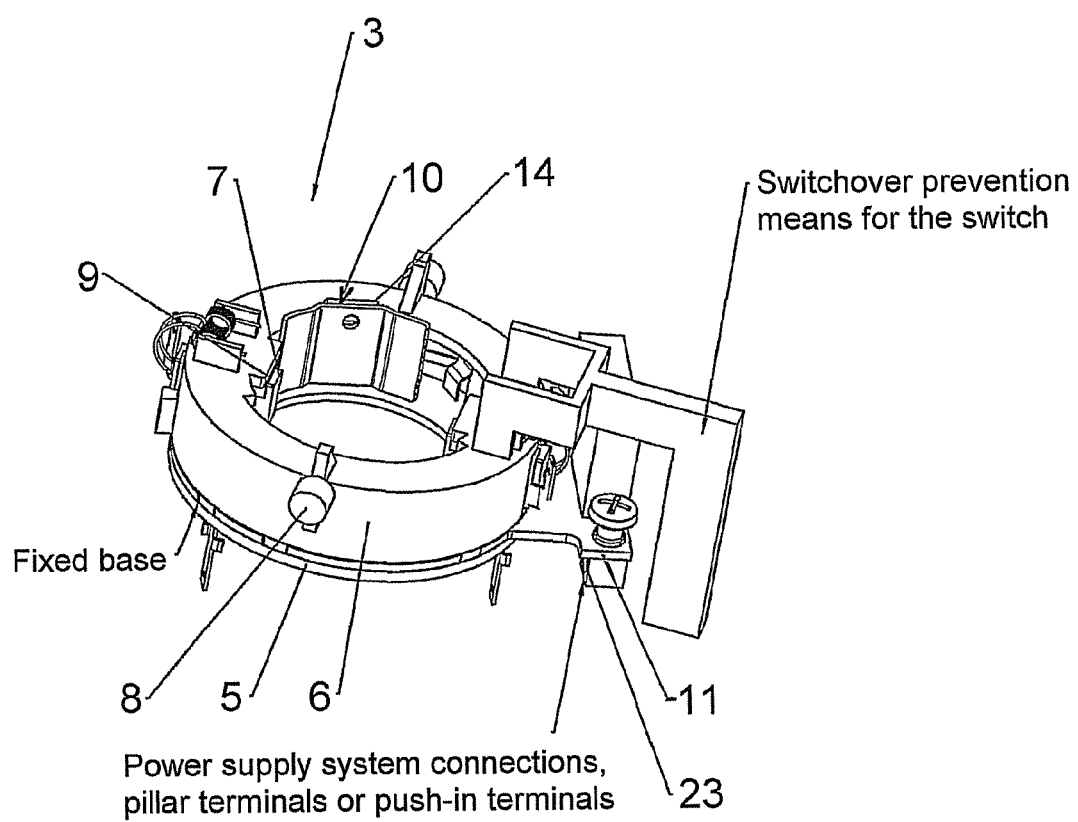
FIG. 4 shows the device as shown in FIG. 3 in another perspective view.

A plug 23, for example with push-in terminals or pillar terminals, for a connection to the power supply system is arranged on the base 5, as shown in FIG. 4. The plug 23 acts as a connection for the supply of voltage to the power electronics 10. Furthermore, the plug 23 shown in FIG. 3 can also be used for the connection, with mechanical and/or electrical contact, to an adjusting element with a potentiometer or the like. If the power electronics 10 are located on the mount 6, the plug 23 can also be arranged on the mount 6. Another rotary potentiometer (not shown in any more detail) can be arranged as adjusting element for the power electronics 10 on the base 5 and/or on the mount 6. The power adjusting ring 3 can have, for example on the side of the handle of the electric tool, a connection possibility by means of which mechanical and electrical contact can be made with the potentiometer.

Figure 6:
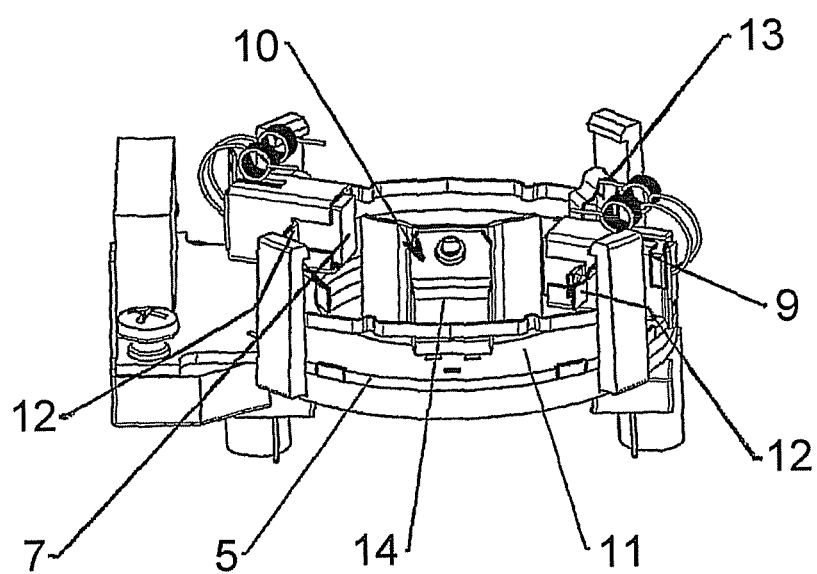
FIG. 6 shows the device corresponding to FIG. 4, with individual parts omitted.
Figure 7:
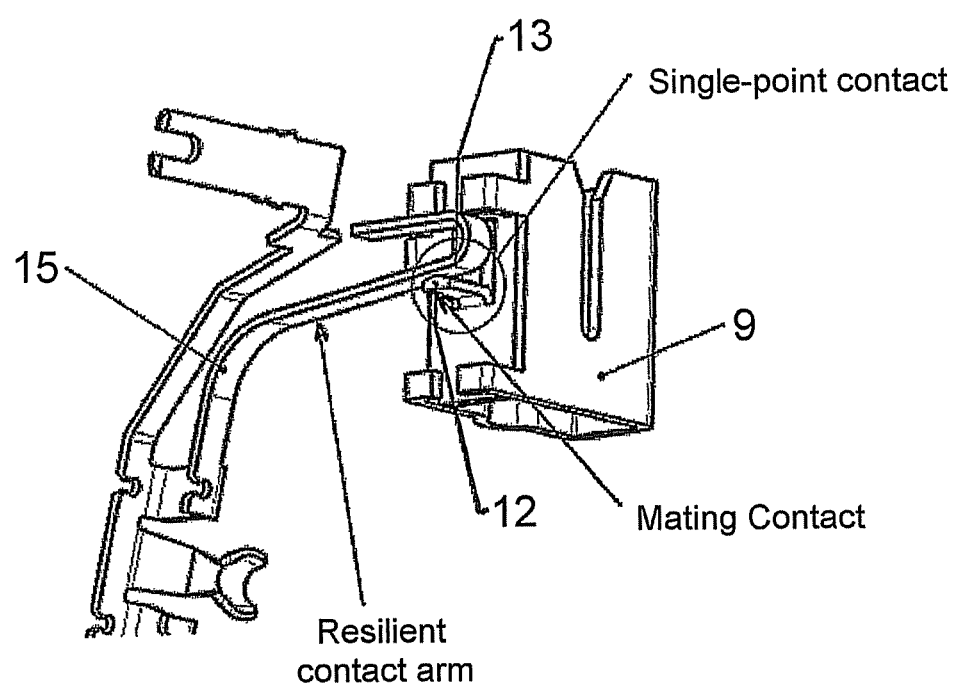
FIG. 7 shows the contact arrangement in the device corresponding to a further embodiment.

The more detailed configuration of the contact arrangement 12, 13 can be seen in FIG. 5 and FIG. 6 as well as in a further embodiment in FIG. 7. The fixed contact 13 shown in FIG. 7 is in the form of an elongate, resilient contact arm 15. The switching contact 12 is in the form of a lateral, protruding and substantially non-resilient contact blade on the brushholder 9. The contact arm 15 interacts with the switching contact 12 as mating contact in switching fashion with single-point contact.

Figure 8:
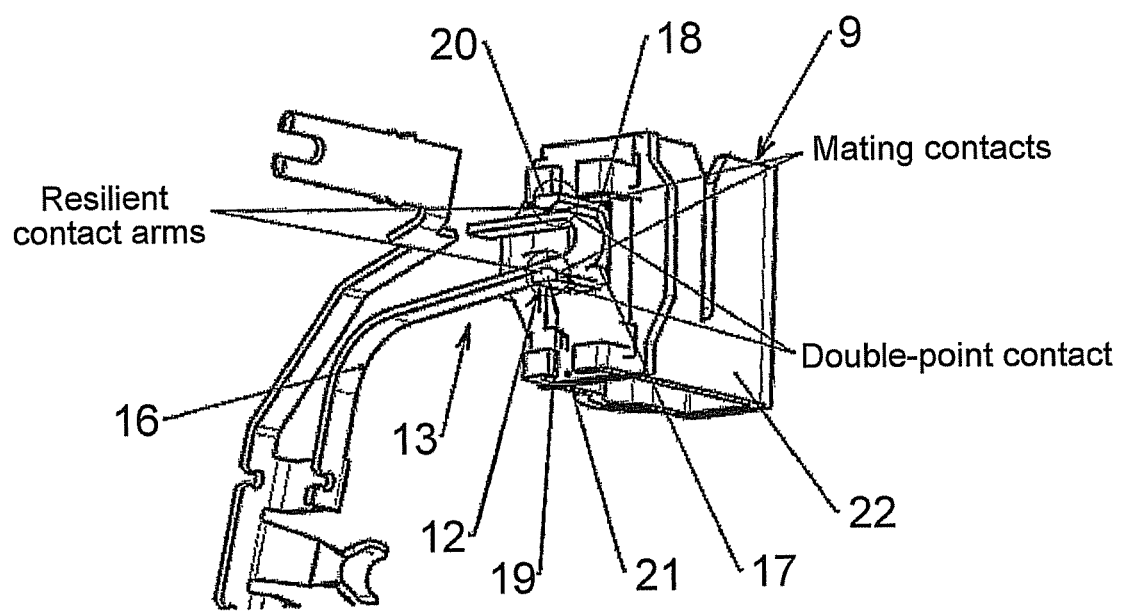
FIG. 8 shows the contact arrangement in the device corresponding to yet another embodiment.

The more detailed configuration of the contact arrangement 12, 13 can be seen in yet another embodiment in FIG. 8. In said figure, the fixed contact 13 comprises a contact track 16 with a contact arm 17, 18 bent in the form of a U. Two mating contacts 19, 20 are arranged as switching contacts 12 on the brushholder 9 in such a way that the fixed contact 13 exerts a force on both sides against the mating contacts 19, 20 with double-point contact.

The brushholder 9 is configured in one or two parts, to be precise in the latter case so as to comprise a base plate 21 consisting of copper and a holder 22 consisting of brass. As can be seen, the contact arms 17, 18 of the fixed contact 13 are resilient and the mating contacts 19, 20 of the switching contact 12 are fixed, i.e. non-resilient. Conversely, it is of course also possible for the contact arms of the fixed contact 13 to be fixed and non-resilient and for the mating contacts of the switching contact 12 to be resilient, but this is not shown in any more detail. In the latter case, the base plate 21 then acts as resilient element for the mating contacts 19, 20. Furthermore, it is possible (likewise not shown in any more detail) for the fixed contact 13 in the form of a contact track to be bent in such a way that two resilient contact arms 17, 18 exert a force against the two mating contacts 19, 20 from the outside instead of from the inside as in FIG. 8.

In a manner known per se, it is possible for elongate contact rivets to interact with the contact arms 17, 18 of the fixed contact 13 which are configured as wedge faces. This configuration assists switching under current. The contact rivets are fitted to the mating contact 19, 20. Finally, the contacts of the contact arrangement 12, 13 can be coated with a precious metal, for example.

The invention is not restricted to the exemplary embodiment described and illustrated. Instead, it also includes all technical developments within the scope of the invention defined by the patent claims. Thus, the power adjusting ring 3 according to the invention can be used not only for electric tools but also for further electrical appliances with mechanical or electronic reversal of direction of rotation.

Furthermore, the adjusting ring 3 can also have the function of a rotary potentiometer and thus be used, for example, in a polishing machine with an angle grinder construction with an "accelerator" function.

LIST OF REFERENCE SYMBOLS

1: Switch (prior art)
2: Electric motor
3: Adjusting ring (for electric tool according to the invention)/power adjusting ring/device for adjusting the carbon brushes
4: Switch (for electric tool according to the invention)
5: Base
6: Mount
7: Carbon brush
8: Actuating cam
9: Brushholder
10: Power electronics
11: Printed circuit board
12: Switching contact/contact arrangement
13: Fixed contact/contact arrangement
14: Power semiconductor
15: Contact arm
16: Contact track
17,18: Contact arm
19,20: Mating contact
21: Base plate (of brushholder)
22: Holder (of brushholder)
23: Plug

We claim:

1. A device for reversing the direction of rotation and/or for adjusting the carbon brushes for a reversible electric motor for an electric hand tool, with a base, with a mount which is mounted pivotably on the base, switching contacts for reversing the direction of rotation of the electric motor and/or brushholders for the carbon brushes wiping over the collector of the electric motor being arranged, the switching contacts in the form of contact blades, being located on the brushholders, which are electrically connected to the carbon brushes, fixed contacts, which are electrically connected to the field windings of the electric motor, being arranged on the base, and the fixed contacts interacting with the switching contacts as mating contacts with alternate contact-making of the carbon brushes, for reversing the direction of rotation of the electric motor as the mount is pivoted, wherein the electric motor is driven by means of at least one of a pulse width controller, a phase gating controller and a phase chopping controller, wherein the power electronics are arranged at least partially on the base and/or on the mount, and wherein the fixed contact is configured as a contact arm which is bent in the form of a U, and such that two mating contacts are arranged as switching contacts such that the fixed contact exerts a force on both sides against the mating contacts.

2. The device as claimed in claim 1, wherein the entire power electronics are arranged on the base and/or on the mount, and wherein signal processing electronics having current sensors and/or sensors for sensing a rotor position of the electric motor are arranged on the base and/or on the mount.

3. The device as claimed in claim 1, wherein the power electronics have at least one power semiconductor, which switches the currents in the motor turns of the electric motor, selected from a triac, a thyristor, a MOSFET, a power diode and an H bridge, and the signal processing electronics and/or the power electronics are encapsulated, and/or cast.

4. The device as claimed in claim 1, wherein the base and/or the mount comprises elements of the electric motor having a bearing shell for a ball bearing of the rotor shaft of the electric motor, and the base and/or the mount forms part of the housing or the supporting structure of the electric hand tool.

5. The device as claimed in claim 1, wherein conducting fins for guiding a cooling air flow, which serve to cool the electric motor, are arranged on the base and/or on the mount such that the cooling air flow cools the power electronics, and a heat sink is arranged on the base and/or on the mount for cooling the power electronics, with a thermal connection to the power semiconductor, and metallic parts of the brushholders for the carbon brushes are in the form of parts which conduct heat and/or emit heat to the air.

6. The device as claimed in claim 1, wherein the supporting structure of the base and/or the mount consists of metal such that the supporting structure serves simultaneously to at least spread heat, to conduct heat and to emit heat to the air and/or another fluid, and the base and/or the mount is/are structured physically such that shielding for improving the EMC and/or the prevention of a flow of heat from the carbon brushes onto the heat-sensitive parts of the power electronics is enabled, and a fan for generating a cooling air flow is arranged on the base and/or on the mount for cooling the power electronics, and the fan power is subjected to open-loop and/or closed-loop control.

7. The device as claimed in claim 1, wherein a plug for the connection to the power supply system, for the connection to the power electronics, for the connection, with mechanical and/or electrical contact, to an adjusting element with a potentiometer is arranged on the base and/or on the mount.

8. The device as claimed in claim 1, wherein a rotary potentiometer is arranged as an adjusting element for the power electronics on the base and/or on the mount.

9. The device as claimed in claim 1, wherein terminals of the power semiconductors in the power electronics make direct electrical and/or thermal contact with the brushholders for the carbon brushes.

10. The device as claimed in claim 1, wherein the contact arms of the fixed contact are configured so as to be resilient and the mating contacts of the switching contact are configured so as to be fixed.

11. The device as claimed in claim 1, wherein the contact arms of the fixed contact are configured so as to be fixed and the mating contacts of the switching contact are configured so as to be resilient such that the base plate acts as the resilient element for the mating contact.

12. The device as claimed in claim 1, wherein the brushholder is configured in two parts comprising a base plate consisting of copper and a holder consisting of brass.

13. The device as claimed in claim 1, wherein the fixed contact in the form of a contact track is bent such that two resilient contact arms exert a force from the outside against the two mating contacts.

14. The device as claimed in claim 1, wherein elongate contact rivets are attached to the contact arms of the fixed contact, said contact arms being configured as wedge faces, wherein the mating contact is provided with contact rivets, and the contacts are coated with a precious metal.

* * * * *

UNITED STATES PATENT AND TRADEMARK OFFICE
CERTIFICATE OF CORRECTION

| | |
|---|---|
| PATENT NO. | : 9,071,119 B2 |
| APPLICATION NO. | : 13/189020 |
| DATED | : June 30, 2015 |
| INVENTOR(S) | : Fuchs |

It is certified that error appears in the above-identified patent and that said Letters Patent is hereby corrected as shown below:

On the Title Page, Item (73),

Change: "Assignee: Marquardt GmbH, Rietheim-Weiheim (DE)" to

-- Assignee: Marquardt GmbH, Rietheim-Weilheim (DE) --

Signed and Sealed this
Twenty-second Day of December, 2015

Michelle K. Lee
*Director of the United States Patent and Trademark Office*